(12) United States Patent
Perrow et al.

(10) Patent No.: US 7,396,283 B2
(45) Date of Patent: Jul. 8, 2008

(54) NEEDLE ROLLER RETAINER FOR TRIPOT JOINT

(75) Inventors: Scott J. Perrow, Freeland, MI (US); David H. Ritter, Midland, MI (US)

(73) Assignee: Delphi Technologies, Inc., Troy, MI (US)

( * ) Notice: Subject to any disclaimer, the term of this patent is extended or adjusted under 35 U.S.C. 154(b) by 197 days.

(21) Appl. No.: 11/258,495

(22) Filed: Oct. 25, 2005

(65) Prior Publication Data

US 2007/0093302 A1 Apr. 26, 2007

(51) Int. Cl.
*F16D 3/205* (2006.01)
(52) U.S. Cl. ............... 464/111; 464/132; 29/525.01
(58) Field of Classification Search ........... 464/111, 464/132, 905; 384/564, 581; 29/428, 446, 29/453, 525.01
See application file for complete search history.

(56) References Cited

U.S. PATENT DOCUMENTS

| | | | | |
|---|---|---|---|---|
| 1,630,339 | A * | 5/1927 | Ganster | 384/564 |
| 5,183,351 | A | 2/1993 | Schneider | 403/50 |
| 6,375,576 | B1 * | 4/2002 | Margerie | 464/111 |
| 6,390,925 | B1 | 5/2002 | Perrow | 464/111 |
| 6,416,231 | B1 * | 7/2002 | Verbrugge et al. | 384/564 |
| 6,533,667 | B2 | 3/2003 | Perrow et al. | 464/111 |
| 6,776,721 | B2 | 8/2004 | Perrow | 464/111 |
| 6,840,863 | B2 | 1/2005 | Perrow | 464/111 |
| 2003/0045363 | A1 | 3/2003 | Sugiyama et al. | 464/111 |
| 2004/0077412 | A1 | 4/2004 | Perrow | 464/124 |
| 2004/0087380 | A1 | 5/2004 | Perrow | 464/124 |
| 2005/0054451 | A1 | 3/2005 | Thomas et al. | 464/143 |
| 2005/0079916 | A1 | 4/2005 | Bongartz et al. | 464/111 |

\* cited by examiner

*Primary Examiner*—Greg Binda
(74) *Attorney, Agent, or Firm*—Michael D. Smith (57) ABSTRACT

A ball assembly (118) for a tripot-style joint includes an annular outer ball (124) having a central axis (L) extending therethrough and a depression (182) formed therein. A plurality of needle rollers (122) is positioned along an interior of the outer ball (124). A needle roller retainer (140) is provided for retaining the needle rollers (122) within the outer ball (124) during operation of the ball assembly (118). The retainer (140) has a base portion (142) axially opposed to an end portion (121) of the needle roller (122), and a flange portion (144) extending from the base portion (142) into the depression (182), the flange portion (144) of the retainer (140) being resiliently pivotable within the depression (182) in response to application of an axial load to the retainer (140). In a particular embodiment, an inner ball (120) is positioned in the interior of the outer ball (124*f*), and a series of resilient tabs (148*f*) extends from the base portion (142*f*) of the retainer (140*f*). The tabs (148*f*) are axially opposed to a portion of the inner ball (120) and are resiliently deflectable in response to application of an axial load thereto by the inner ball (120), thereby permitting at least a portion of the inner ball (120) to move out of the interior of the outer ball (124).

18 Claims, 9 Drawing Sheets

NEEDLE ROLLER RETAINER FOR TRIPOT JOINT

BACKGROUND OF THE INVENTION

This invention relates to tripot style joints and, more particularly, to a tripot joint having a retainer for needle rollers.

A tripot style joint is usable as one type of constant velocity ("CV") joint on a drive axle of a vehicle. A CV joint is used to transfer a uniform torque and a constant speed, while operating through a wide range of angles. The CV joint is preferably quite compact so as to allow the drive axle to rotate at a constant velocity, regardless of the operating angle.

Figure 1:
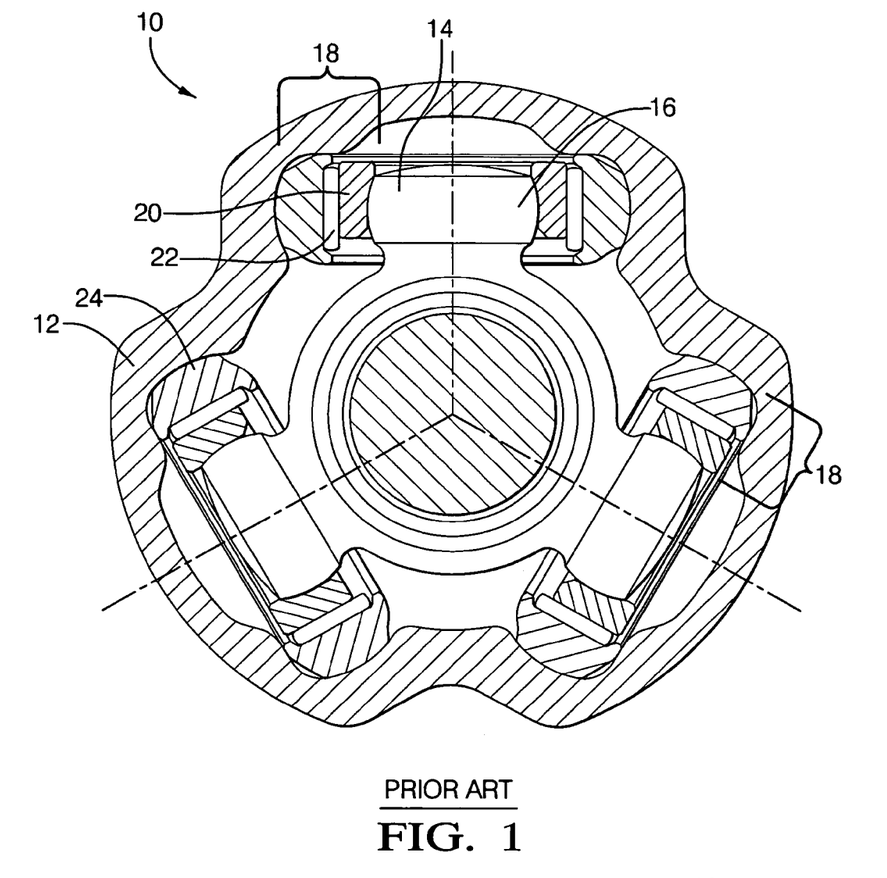
FIG. 1 is a cross-sectional view of a prior art tripot-style joint.
Figure 2:
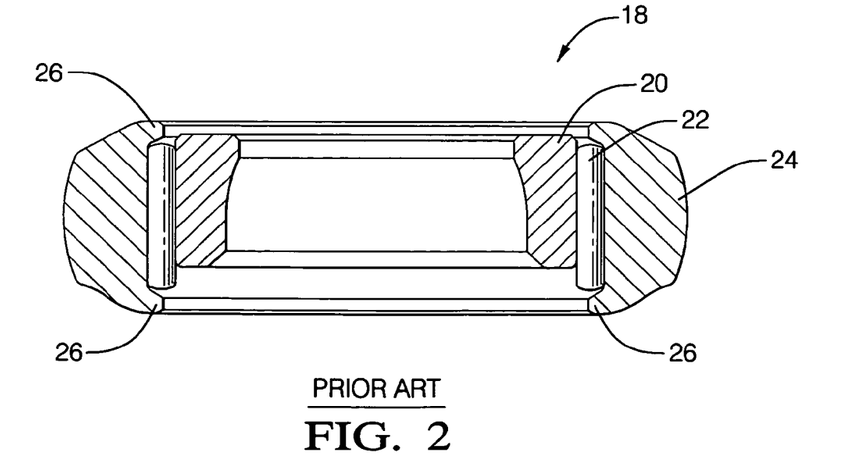
FIG. 2 is a cross-sectional view of the ball assembly used in the prior art tripot-style joint of FIG. 1.

Turning now to FIGS. 1 and 2, a tripot style joint 10 includes a tripot housing 12 formed with a ball guide, the interior grooves of the housing 12. That is, the housing 12 has an offset radius profile for the ball bore and an outer ball guide to help track the outer ball relative to die housing axis. A tripot spider 14 includes a somewhat spherical trunnion 16, a ball assembly 18 having an inner ball 20, a complement of needle rollers 22, and an outer ball 24. The inner ball 20 has a spherical radius profile on the inner diameter that mates to the spherical profile of die spider trunnion 16 and a cylindrical outer diameter that mates with the needle rollers 22. The complement of needle rollers 22 mates to the outer diameter of the inner ball 20 and the inner diameter of the outer ball 24. The outer ball 24 has a cylindrical inner diameter and a radius profile outer diameter to match the ball bore of the housing 12. As shown in FIG. 2, the inner diameter of the outer ball 24 is designed with two shoulders 26 that form a cup. The cup area contains the complement of needle rollers 22.

The primary function of such a tripot joint 10 is to reduce axial forces generated during the operation of the joint 10 within a vehicle. The generated axial forces create a ride disturbance in the vehicle called "shudder". The reduction to the generated axial forces is accomplished by tracking either the outer ball 24 or the ball assembly 18 relative to the axis of the housing 12.

The ball assembly 18 also requires some means of retaining the needle rollers 22 within the interior of the outer ball 24. The design shown in FIGS. 1 and 2 utilizes an integral flange 26 to retain the needle rollers 22 within the outer ball 24. However, the inner diameter profile of the outer ball 24 that forms flange 26 is expensive to manufacture. In most cases, the flange 26 is through-hardened due to its cross-sectional shape and the types of materials used in fabricating the outer ball. To achieve sufficient strength in the through-hardened flange 26 for retaining the needle rollers 22 within the interior of the outer ball 24, it is often necessary to increase the cross-sectional thickness of the flange, resulting in an increase in the overall package size of the joint. In addition, flange 26 may have sufficient strength to retain the needle rollers during assembly of the joint, yet fail to retain the needle rollers during actual operation of the joint.

SUMMARY OF THE INVENTION

A ball assembly for a tripot-style joint includes an annular outer ball having a central axis extending therethrough and a depression formed therealong. A plurality of needle rollers is positioned along an interior of the outer ball. A needle roller retainer is provided for retaining the needle rollers within the outer ball during operation of the ball assembly. The retainer has a base portion axially opposed to an end portion of the needle roller, and a flange portion extending from the base portion into the depression. The flange portion of the retainer is pivotable within the depression in response to application of an axial load to the retainer. In a particular embodiment, an inner ball is positioned in the interior of the outer ball, and a series of resilient tabs extends generally radially inwardly from the base portion of the retainer. The tabs are axially opposed to portions of the inner ball and are resiliently deflectable in response to application of an axial load thereto by the inner ball, thereby permitting at least a portion of the inner ball to move out of the interior of the outer ball.

BRIEF DESCRIPTION OF THE DRAWINGS

Referring to the exemplary drawings wherein like elements are numbered alike in the several figures.

DETAILED DESCRIPTION

Figure 3:
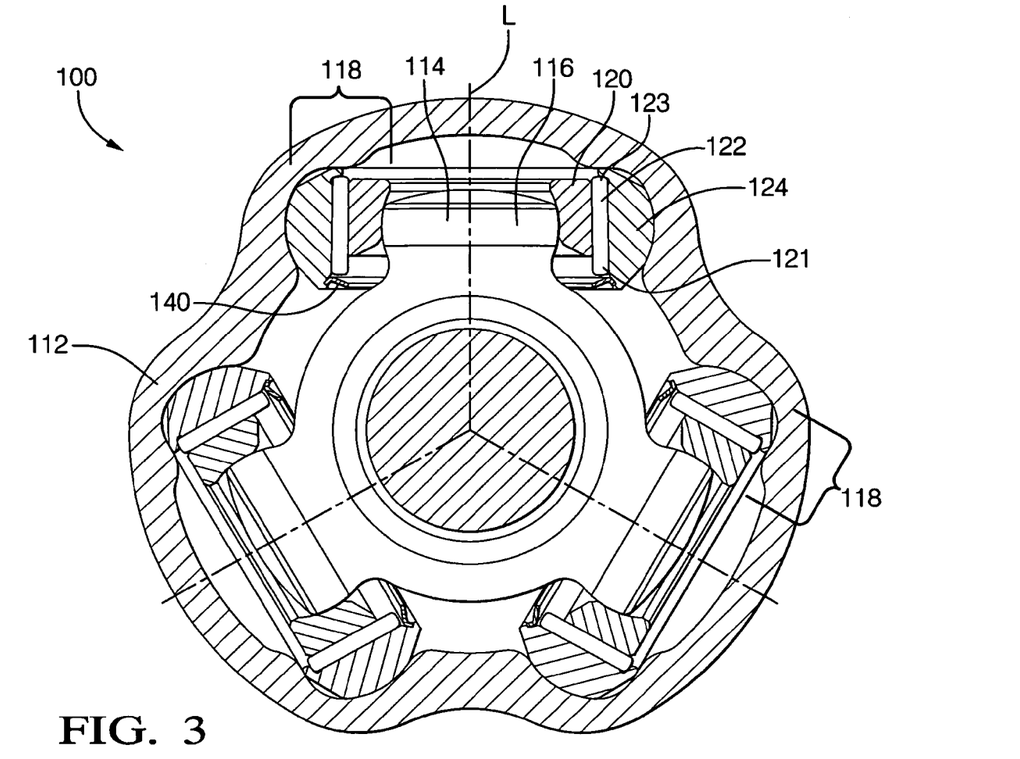
FIG. 3 is a cross-sectional view of a tripot style joint incorporating a ball assembly in accordance with a first embodiment of the present invention.

Referring to FIG. 3, a tripot style joint 100 is shown. Similar to the tripot style joint 10 shown in FIG. 1, the tripot style joint 100 includes a tripot housing 112 formed with a ball guide, the interior grooves of the housing 112. That is, the housing 112 has an offset radius profile forte ball bore and an outer ball guide to help track the outer ball 124 relative so the housing axis. A tripot spider 114 includes a generally spherical trunnion 116, a ball assembly 118 having an inner ball 120, a complement of needle rollers 122, and an outer ball 124. The inner ball 120 has a spherical radius profile on the inner diameter that wales to the spherical profile of the spider trunnion 116 and a cylindrical outer diameter that mates with the needle rollers 122. The complement of needle rollers 122 mates to the outer diameter of the inner ball 120 and the inner diameter of the outer ball 124. The outer ball 124 has a cylindrical inner diameter and a radius profile outer diameter to match the ball bore of the housing 112.

It should be understood that the tripot style joint 100 is shown in cross-section in FIG. 3. While the trunnion 116 may have a somewhat compressed spherical shape, it is within the scope of this invention to provide the trunnion 116 with a rod shape or cylindrical shape, either having a generally circular cross-section. In either case, the inner ball 120 and the outer ball 124 have generally cylindrical, tubular shapes where the inner ball 120 has a smaller outer diameter than the inner diameter of the outer ball 124. That is, the inner ball 120 and the outer ball 124 are arranged generally concentrically around the trunnion 116. By generally cylindrical, it is meant that the inner ball 120 and outer ball 124 possess tubular shapes, open in the middle with material extending 360 degrees around the open interior. The inner and outer surfaces of the inner ball 120 and outer ball 124, however, possess cylindrically extending grooves and varying curvatures, as shown by the cross-sectional view of FIG. 3. Thus, each trunnion 116 is surrounded by a single inner ball 120 possessing the cross-section shown on either side of the trunnion 116 and a single outer ball 124 possessing the cross-section shown on either side of the trunnion 116, each of the inner ball 120 and the outer ball 124 being toroids concentrically surrounding the trunnion 116.

Likewise, although only two needle rollers 122 are shown in cross-section on diametrically opposite sides of each trunnion 116, there are preferably a plurality of needle rollers 122 which surround each trunnion 116. Each needle roller 122 may have a pin shape with a circular cross section taken along a plane extending perpendicularly into the cross-sectional view shown in FIG. 3. Each pin shaped needle roller 122 is preferably placed in abutting fashion against an adjacent needle roller 122 until the trunnion 116 is completely surrounded by needle rollers 122. Thus, when reviewing FIG. 3, it should be understood that each trunnion 116 is preferably surrounded by a single inner ball 120, a plurality of needle rollers 122, and a single outer ball 124. Each needle roller 122 has a length measured along its longitudinal axis extending from its outer end 123 to its inner end 121. In the embodiment shown in FIG. 3, the length of each needle roller 122 is the same.

Referring again to FIGS. 4, 5, 6A, and 6B, in accordance with the present invention, a retainer 140 is provided for retaining needle rollers 122 within the interior of outer ball 124. Retainer 140 has a base portion 142 and a flange portion 144 extending from base portion 142. When viewed in cross-section (FIG. 6B), base portion 142 is in the general form of a hollow truncated conical section. Flange portion 144 generally extends at a non-zero angle from base portion 142. In the embodiment shown in FIGS. 4, 5, 6A, and 6B, an interior angle Φ (FIG. 5) between base portion 142 and flange portion 144 is greater than 90 degrees and less than 180 degrees, although an angle Φ equal to 90 degrees would also be within the scope of this invention. The needle retainers 140 may be stamped and formed from spring steel, although alternate materials are within the scope of the invention.

Figure 4:
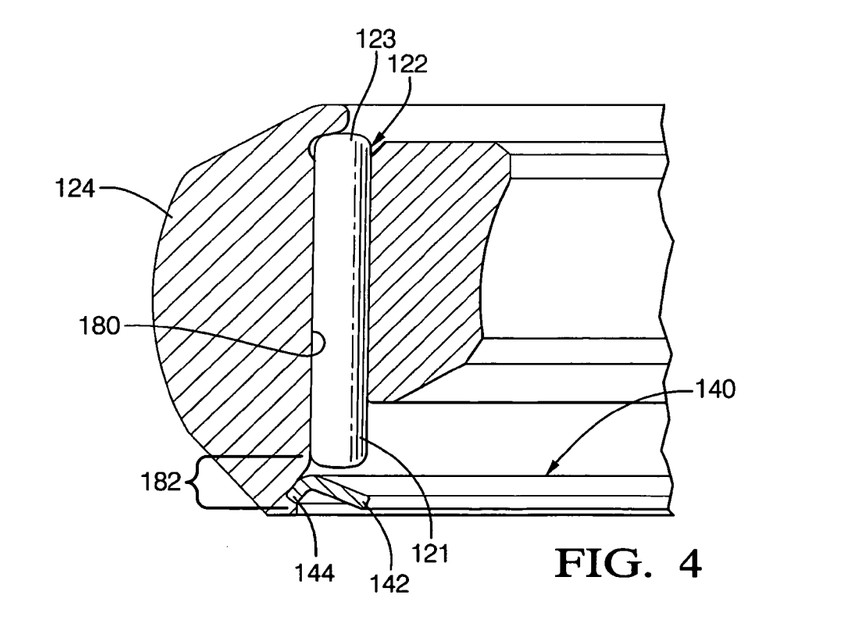
FIG. 4 is an enlarged partial cross-sectional view of the ball assembly end retainer used in the tripot-style joint of FIG. 3.
Figure 5:
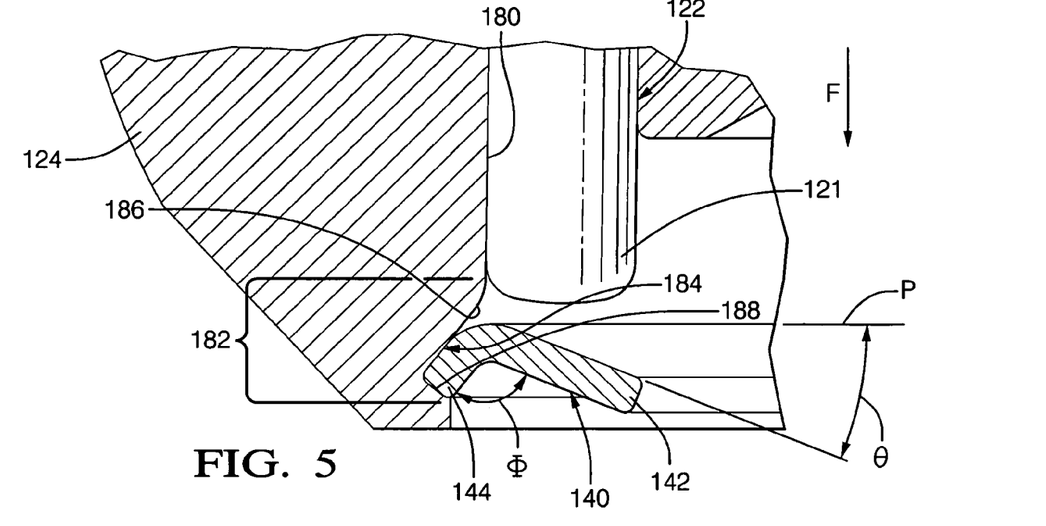
FIG. 5 is an enlarged partial view of a portion of die ball assembly of FIG. 4.

Referring to FIGS. 3-5, outer ball 124 has a central axis L extending therethrough and a generally annular interior surface 180 along which a depression 182 is formed. Outer ball 124 may be made of bearing steel, although alternate materials usable in the tripot joint 100 are within the scope of this invention. In a first embodiment, shown in FIG. 5, depression 182 is defined by a first surface 186 tapering radially outwardly and a second surface 188 adjacent first surface 186. Surface 188 tapers radially inwardly with respect to axis L to form a shoulder engageable by flange portion 144 upon application of an axial load to retainer 140 by needle roller 122.

Retainer 140 may be press-fit into outer ball depression 182 until flange portion 144 snaps into the depression. As seen in FIGS. 4 and 5, when retainer 140 is assembled into outer ball depression 182, flange portion 144 extends into depression 182 and base portion 142 extends generally radially inwardly with respect to axis L (FIG. 3) such that the base portion is axially opposed to an end portion 121 of needle roller 122. Stated another way, base portion 142 is positioned opposite end 121 of needle roller 122 and spaced apart from the needle roller along an axial direction. More particularly, as seen in FIG. 5, when retainer 140 is assembled into depression 182, flange portion 144 contacts a portion of outer ball 124 positioned within the depression. The geometries of flange portion 144 and outer ball depression 182 are formed such that flange portion 144 is resiliently pivotable within depression 182 about a contact interface 184 between flange portion 144 and outer ball 124 in response to application of an axial load to retainer 140 in the direction of arrow F, in a manner described in greater detail below.

Referring again to FIG. 5, it may be seen that when retainer 140 is assembled into outer ball depression 182 and prior to an application of axial loads by needle rollers 122 to retainer 140, retainer base portion 142 forms an angle θ with a plane P extending substantially perpendicular to central axis L. In the embodiment shown in FIG. 5, angle θ has a value in the range 0° □θ<90°. It is believed that, as the value of angle θ increases (i.e., as angle θ approaches 90°), the resistance of retainer 140 to rotational movement of needle rollers 122 is reduced. Thus, to some degree, the forces necessary to rotate needle rollers 122 may be controlled by selection of a suitable value for angle θ.

Figure 6A:
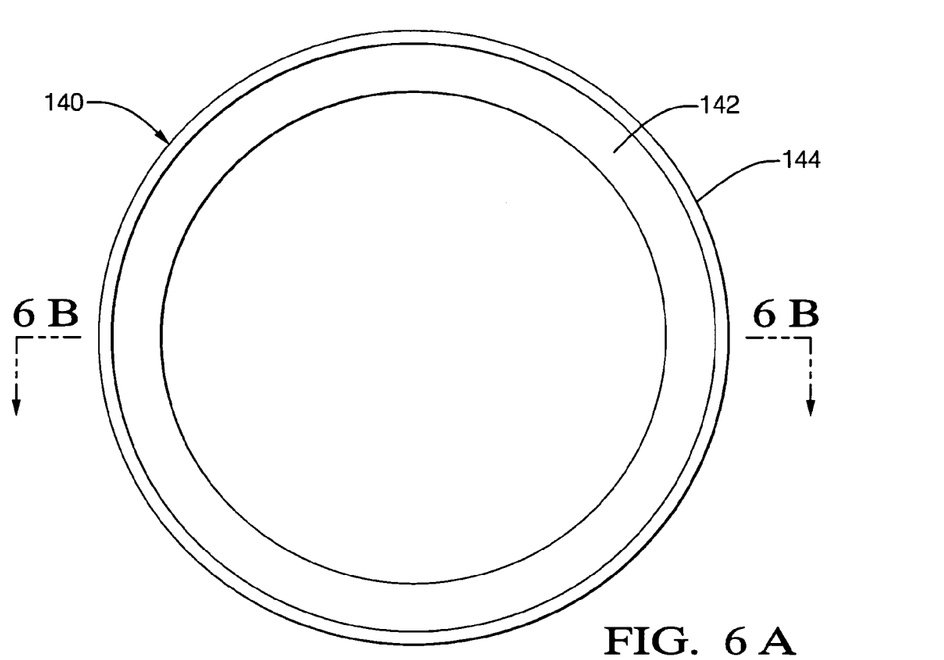
FIG. 6A is a plan view of a needle roller retainer incorporated into the embodiment of the ball assembly shown in FIG. 3.
Figure 6B:
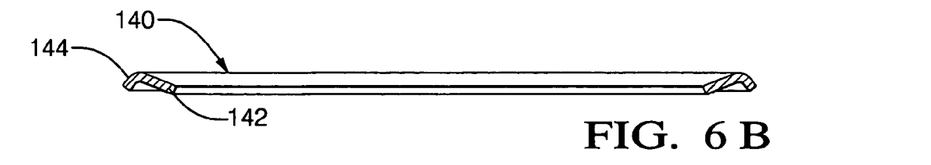
FIG. 6B is a cross-sectional side view of the needle roller retainer of FIG. 6A.
Figure 7:
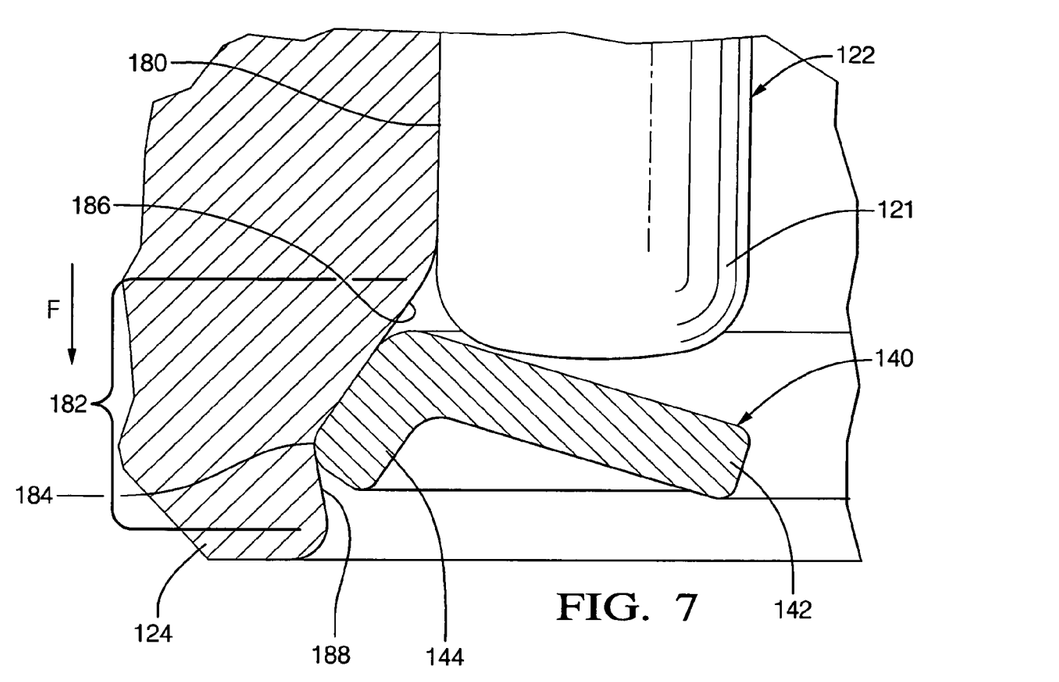
FIGS. 7 and 8 am enlarged partial views of the ball assembly of FIG. 5 showing operation of the retainer.
Figure 8:
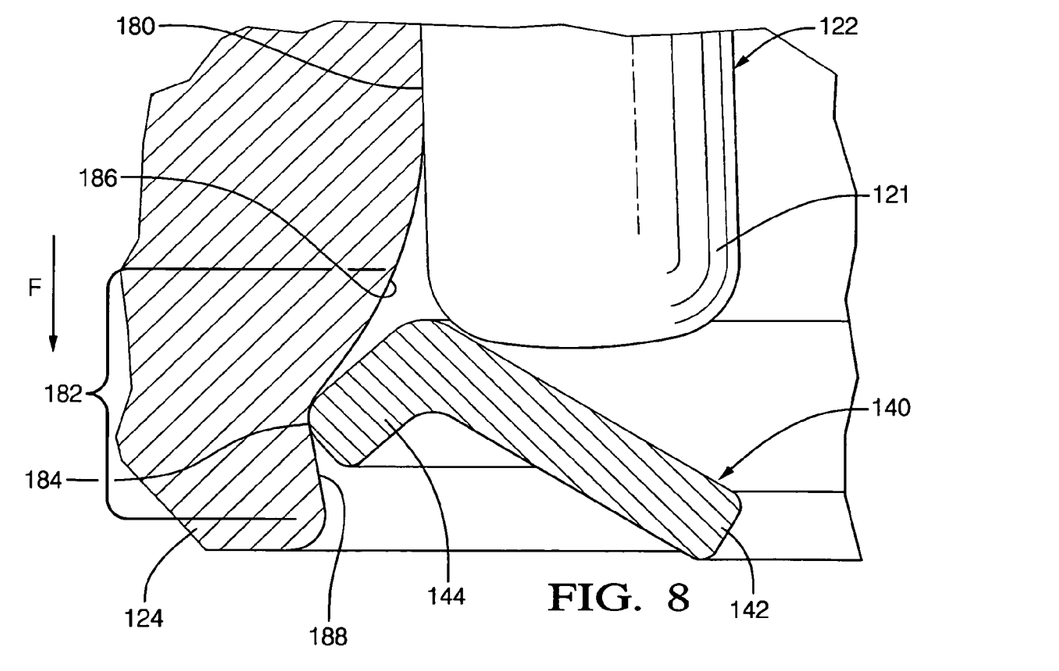
Figure 9:
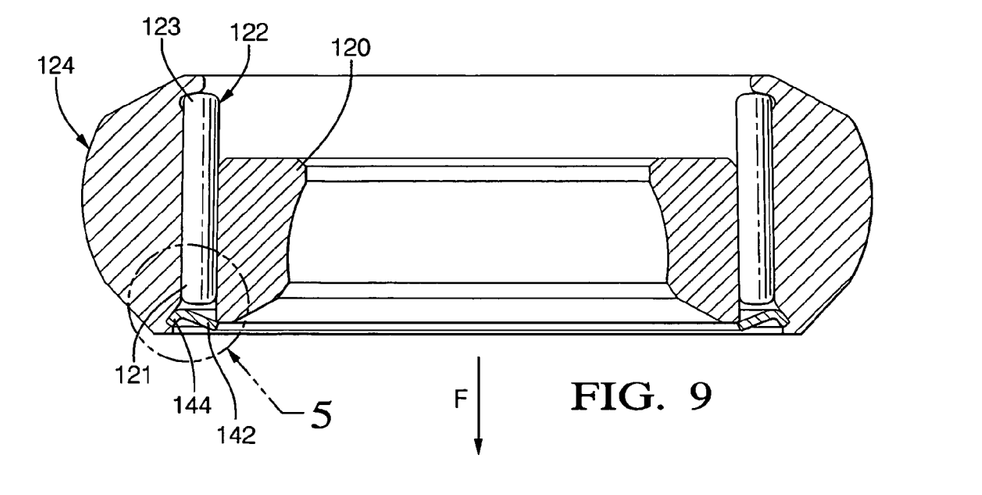
FIG. 9 is a cross-sectional side view of a portion of the ball assembly of FIG. 3 showing operation of the retainer.

FIGS. 7, 8, and 9 show operation of the retainer of FIGS. 6A and 6B upon application of an axial load (in the direction indicated by arrow F) to retainer 140. Upon application of an axial load (i.e., a load applied substantially parallel to axis L) to needle bearing 122, the needle bearing is displaced axially, impinging upon retainer base portion 142. Retainer flange portion 144 is positioned within depression 182 and is substantially constrained from moving axially, while base portion 142 is unconstrained by direct contact with outer ball 124. Thus, as the axial force on needle bearing 122 is transferred to retainer 140, flange portion 144 and base portion 142 are forced to resiliently pivot within depression 182 about contact interface 184 between flange portion 144 and outer ball 124. Therefore, the structure of retainer 140, operating in conjunction with the structure of depression 182, provides a self-locking feature when an axial load is applied to retainer 140 by needle rollers 122. In the configuration shown, retainer 140 is capable of retaining needle rollers 122 within the interior of outer ball 124 both during assembly and handling of the joint, and also during actual operation of the joint. Upon removal of the axial load on retainer 140, the retainer returns to its pre-loaded orientation within outer ball 124.

Figure 10:
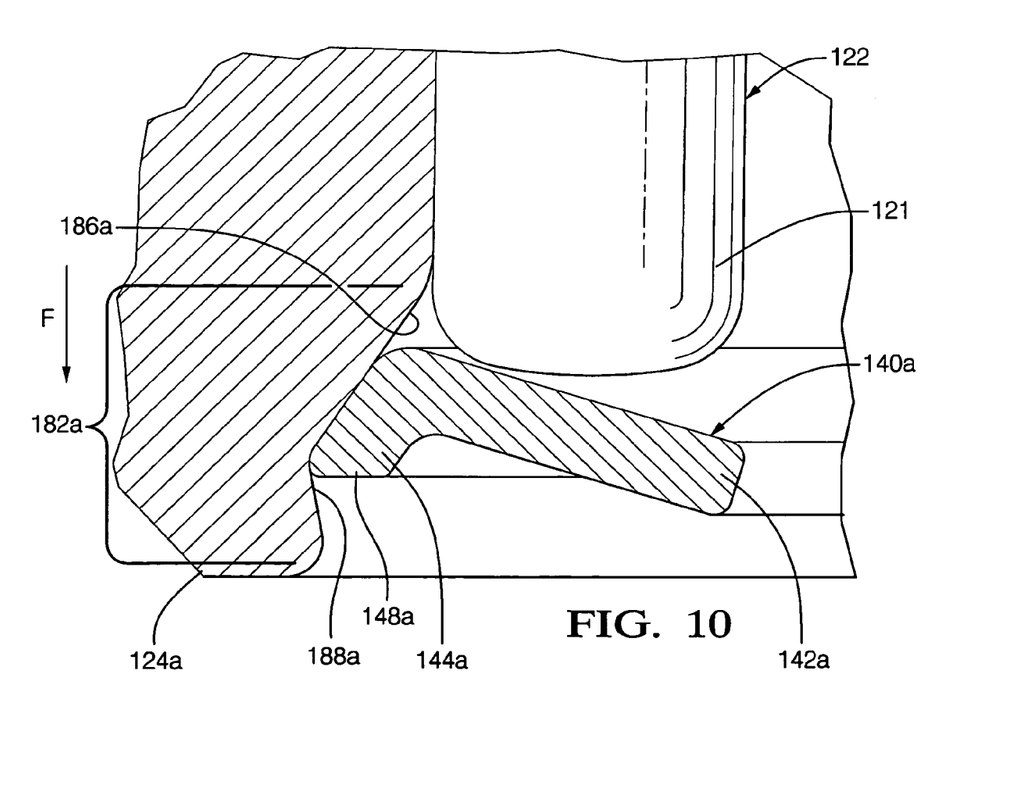
FIGS. 10-15 are enlarged partial views of ball assemblies incorporating various alternative embodiments of the outer ball and the retainer.

Referring to FIG. 10, in a particular embodiment of the retainer, flange portion 144a of retainer 140a includes a surface 148a extending substantially radially.

Figure 11:
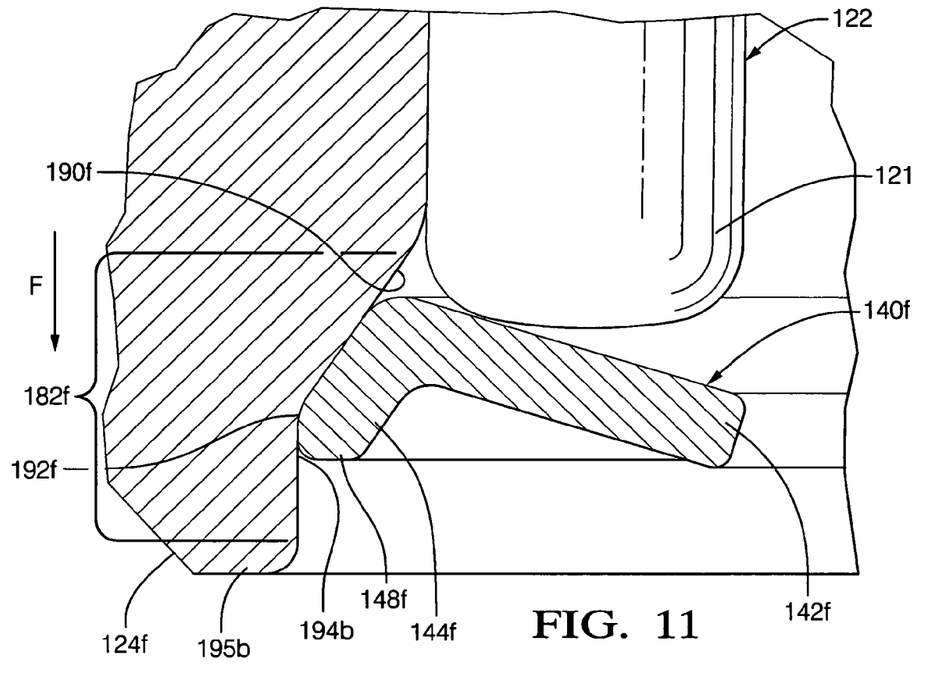

Referring to FIG. 11, in an alternative embodiment of the outer ball depression, depression 182f is defined by a first surface 190f tapering radially outwardly with respect to axis L and a second, adjacent surface 192f extending substantially axially along outer ball 124f. In this embodiment, because no interfering hard shoulder is formed by surface 192f, a portion of outer ball surface 192f contacting retainer flange portion 144f (and/or an outer surface of flange portion 144f in contact with surface 192f) is provided with a surface roughness designed to ensure a minimum predetermined static friction coefficient between surface 192f and flange portion 144f. Increasing the surface roughness of flange portion 144f and/or surface 192f at the contact interface between them generally increases the axial force required to initiate a sliding motion between flange portion 144f and outer ball surface 192*f*, and aids in ensuring that at least a minimum predetermined axial load will be required begin movement of retainer 140*f* in an axial direction. Localized roughness of outer ball surface 192*f* may be increased prior to assembly of the joint by a known abrasive or other surface deformation process. Localized roughness of flange portion 144*f* may be increased either during or after fabrication of the retainer, also using a known abrasive or other surface deformation process.

Figure 12:
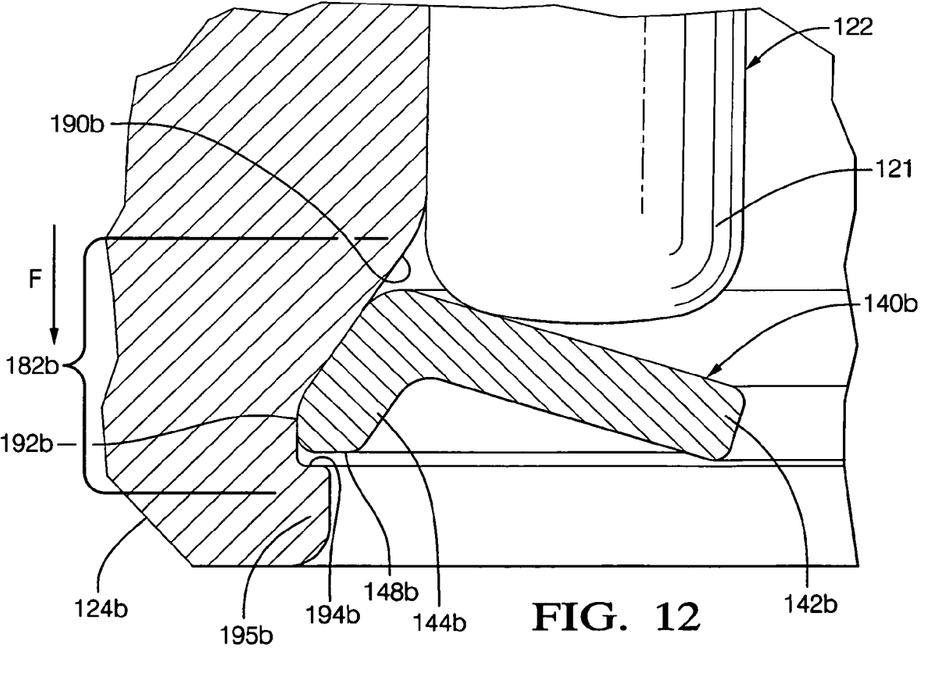

In another alternative embodiment, shown in FIG. 12, a depression 182*b* is defined by a first surface 190*b* tapering radially outwardly with respect to axis L, a second adjacent surface 192*b* extending substantially axially along outer ball 124*b*, and at least one third surface 194*b* adjacent second surface 192*b*. In the embodiment shown in FIG. 12, third surface 194*b* extends substantially radially to form a shoulder 195*b* which is engageable by retainer flange portion 144*b* upon application of an axial load to retainer 140*b*. In this embodiment, retainer 140*b* includes a substantially radially-extending surface 148*b* (similar to surface 148*a* previously shown in FIG. 10). Surface 148*b* provides a bearing surface for engaging outer ball surface 194*b* when an axial load is applied to retainer 140*b*, forcing the retainer to move in an axial direction. The prominent shoulder 195*b* formed by radially-inwardly extending surface 194*b* increases the retention capacity of retainer 140*b*. In the embodiment shown in FIG. 12, flange portion 144*b* is spaced apart from third surface 194*b* prior to application of an axial load to retainer 140*b*. This spacing aids in ensuring clearance between flange portion 144*b* and surface 194*b* for assembly purposes. Upon application of an axial force to retainer 140*b* in the direction indicated by arrow F, flange portion 144*b* is axially displaced until it engages outer ball surface 194*b*, at which point continued application of the axial load causes flange portion 144*b* to pivot about the contact interface between the flange portion and shoulder 195*b*, as previously described.

Figure 13:
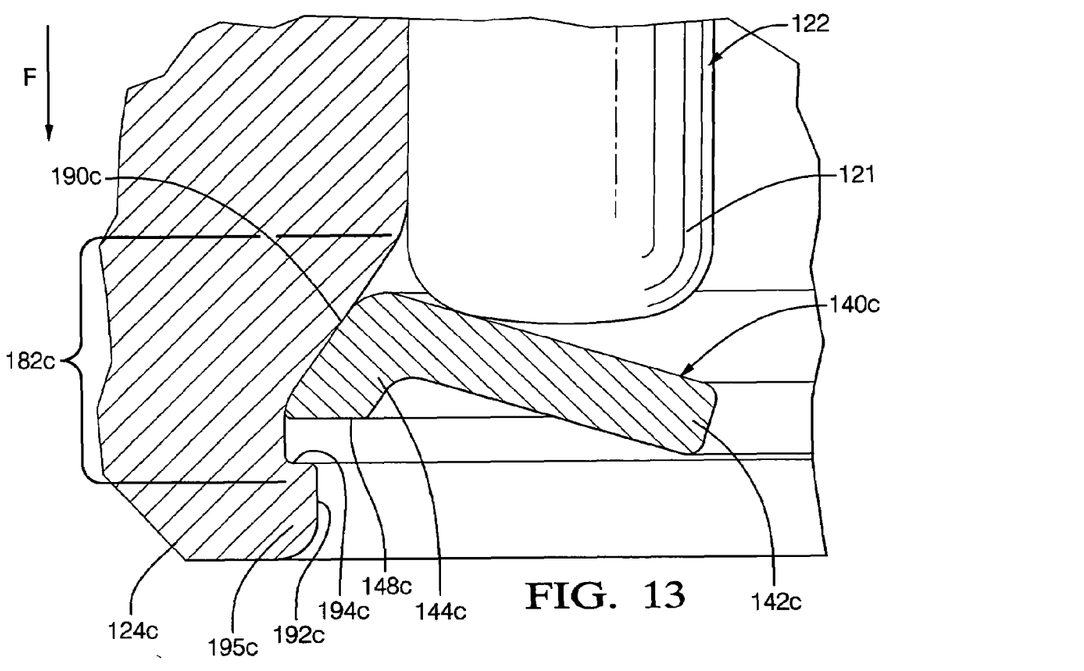

FIG. 13 shows another embodiment similar in construction an operation to the embodiment shown in FIG. 12. In FIGS. 12 and 13, like elements have similar element numbers.

Figure 14:
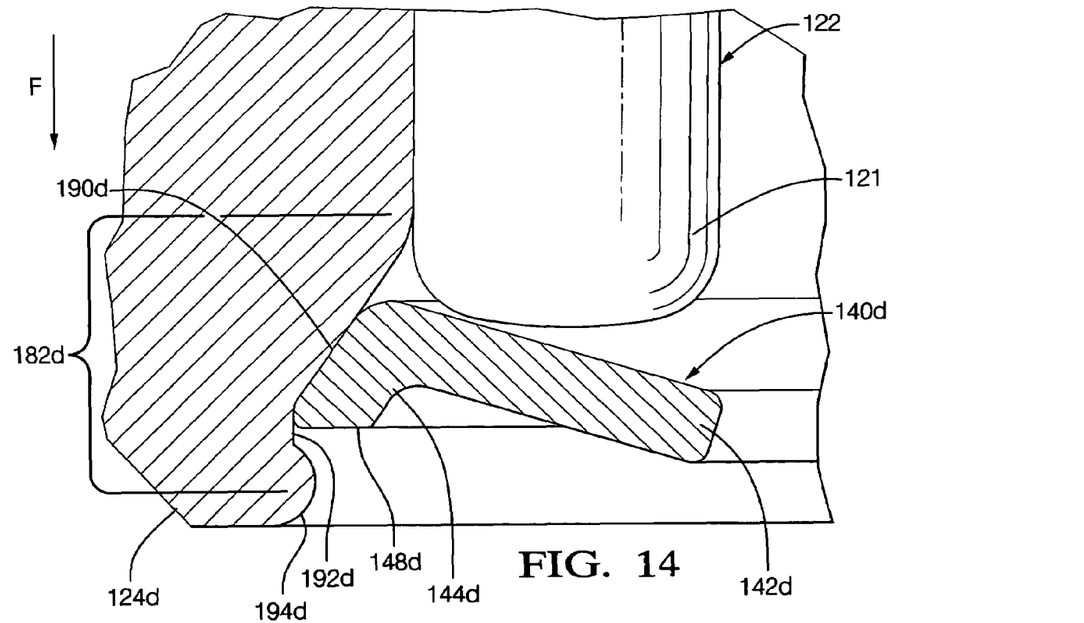

Referring to FIG. 14, in another alternative embodiment, the third surface(s) 194*d* forming part of depression 182*d* are in the form of a plurality of generally radially-inwardly extending bulges projecting from axially-extending surface 192*d*. Bulges 194*d* are spaced-apart about the interior portion of outer ball 124*d* to provide a series of localized hard shoulders for engaging flange portion 144*d* upon application of an axial load to retainer 140*d*, thereby preventing withdrawal of the flange portion from the interior of outer ball 124*d*. Bulges 194*d* may be formed by crimping or otherwise locally deforming the material of outer ball 124*d* along surface 192*d*.

Figure 15:
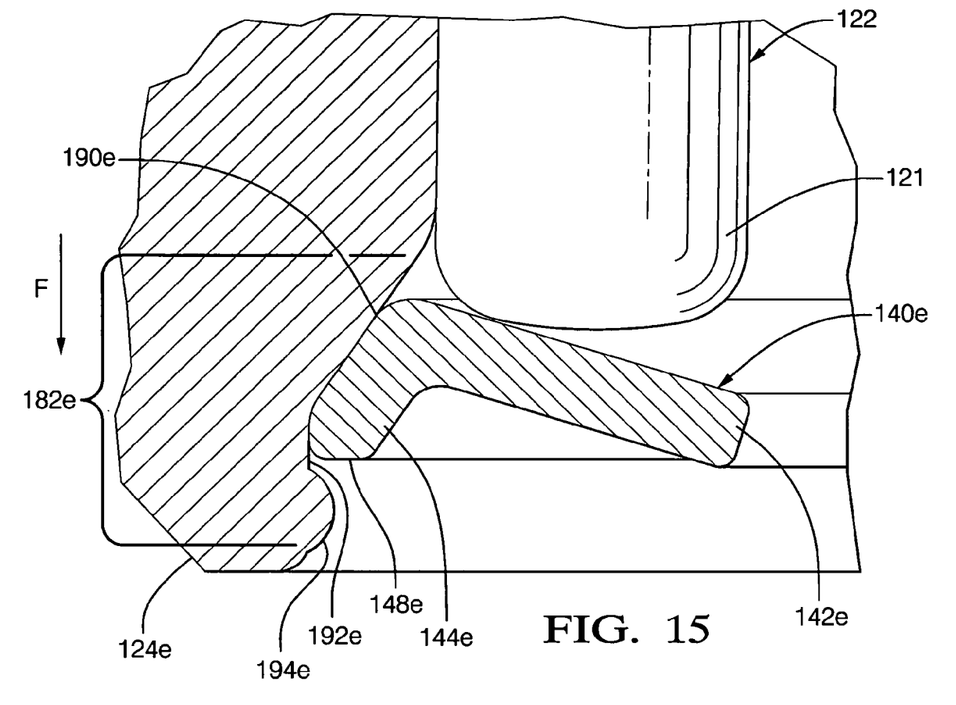

FIG. 15 shows an embodiment similar in construction and operation to that shown in FIG. 14, using a slightly different design of the flange portion 144*e*.

Figure 16A:
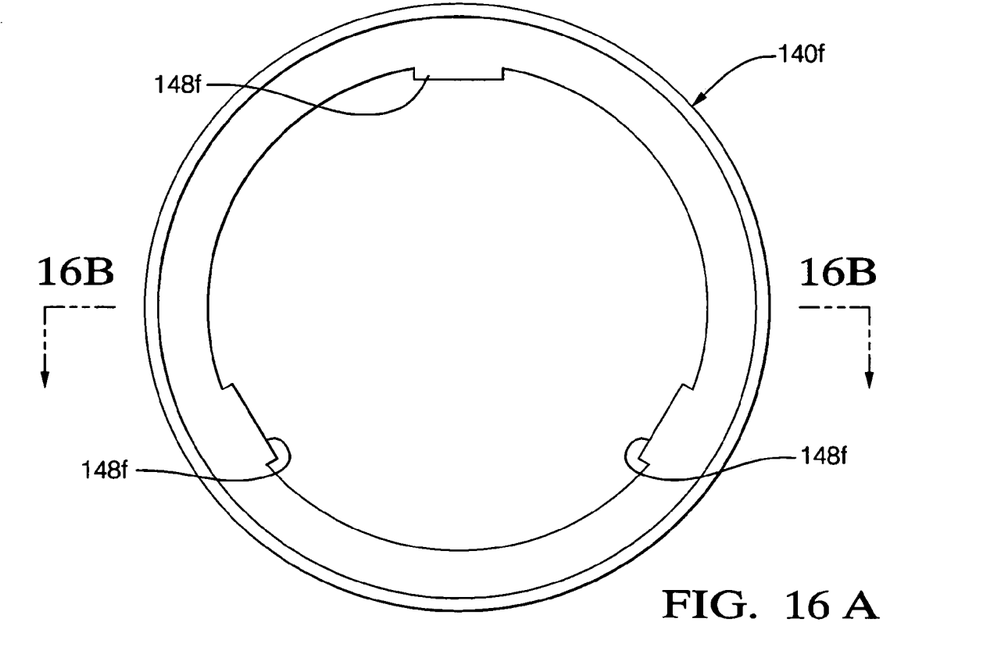
FIG. 16A is a plan view of a needle roller retainer incorporated into another alternative embodiment of the ball assembly.
Figure 16B:
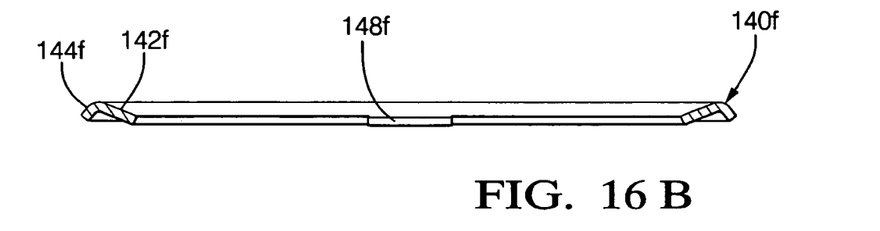
FIG. 16B is a cross-sectional side view of the needle roller retainer of FIG. 6A.
Figure 17:
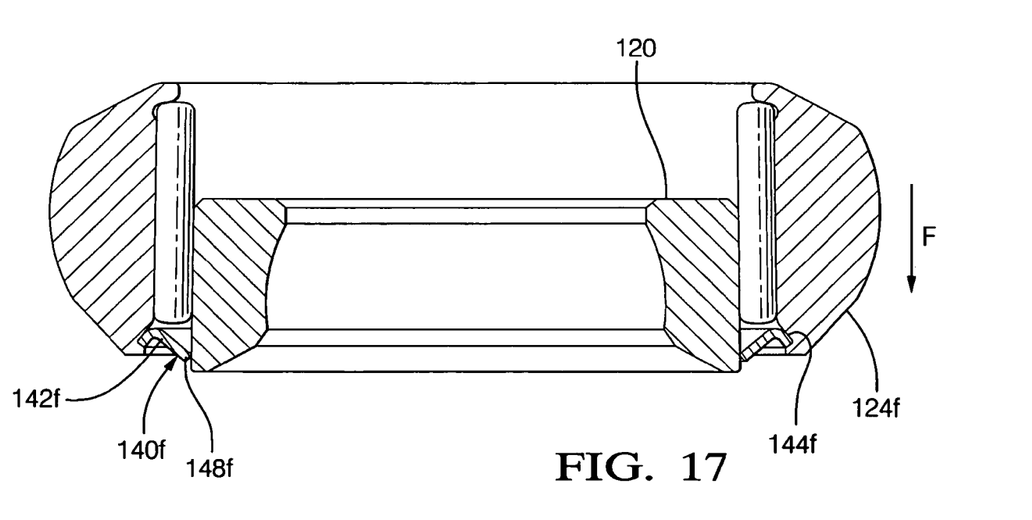
FIG. 17 is a cross-sectional side view of a portion of a ball assembly showing operation of the retainer of FIGS. 16A and 16B.

Referring to FIGS. 16A, 16B, and 17, in yet another embodiment of the retainer, a plurality of resilient tabs 148*f* is spaced about an inner edge of base portion 142*f*. Tabs 148*f* extend generally radially inwardly such that the tabs are axially opposed to at least a portion of inner ball 120. Tabs 148*f* are resiliently deflectable in response to application of an axial load by inner ball 120, thereby permitting at least a portion of inner ball 120 to move out of the interior of outer ball 124*f*. Tabs 148*f* are designed such that axial forces encountered by inner ball 120 and transferred to tabs 148*f* during assembly and handling of the joint are insufficient to cause deflection of the tabs. Thus, inner ball 120 is retained within the interior of outer ball 124*f* by retainer 140*f* during assembly and normal handling of the joint. However, the design of retainer 140*f* also permits deflection of the tabs by inner ball 120 due to axial loads encountered during actual operation of the joint. Thus, at least a portion of inner ball 120 may move out of the interior of outer ball 124*f* during operation of the joint.

The retainer system disclosed herein (comprising retainer 140 and depression 182 formed in outer ball 124) may be incorporated into any one of a variety of tripot joint designs, to provide a simplified retention system for retaining needle rollers 122 and/or inner ball 120 within the interior of the outer ball. The retainer system disclosed herein can also be integrated into cup-type bearing assemblies and into any bearing assembly that uses a ring-type needle retainer system. In addition, although the joint described herein is shown incorporating only one retainer 140 positioned on an inner side of the ball assembly, it will be understood that the same retainer system described herein may be applied to the opposite, outer side of the ball assembly to retain needle rollers 122 and inner ball 120 within the opposite side of the outer ball.

The retainer of the present invention also permits simplification of the outer ball design, obviating the need for a relatively costly cup-shaped flange along the interior of the outer ball and eliminating the need for through-hardening of the flange for retaining the needle bearings. This allows an outer ball with a relatively smaller cross-section to retain the needle bearings therein during both manufacturing and operation of the ball assembly, thereby reducing the package size and mass of the assembly. The retainer design disclosed herein also allows the inner ball to pass through the retainer during joint operation while confining the needle bearings within the outer ball interior.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

The invention claimed is:

1. A ball assembly for a tripot-style joint, the ball assembly comprising:

an annular outer ball having a central axis extending therethrough and a depression formed therein;

a needle roller positioned along an interior of the outer ball; and a needle roller retainer having a base portion axially opposed to an end portion of the needle roller to retain the needle roller within the ball assembly during operation of the ball assembly, and a flange portion extending from the base portion into the depression, the flange portion of the retainer being resiliently pivotable within the depression in response to application of an axial load to the retainer.

2. The ball assembly of claim 1 wherein the flange portion contacts a portion of the outer ball positioned within the depression, and wherein the flange portion is resiliently pivotable about a contact interface between the flange portion and the portion of the outer ball in response to application of the axial load to the retainer.

3. The ball assembly of claim 2 wherein a surface of the portion of the outer ball contacting the flange portion of the retainer baa a surface roughness adapted to provide a minimum predetermined static friction coefficient between the surface of the outer ball portion and the flange portion.

4. The ball assembly of claim 2 wherein a surface of the flange portion of the retainer contacting the portion of the outer ball has a surface roughness adapted to provide a minimum predetermined static friction coefficient between the surface of the flange portion and the outer ball portion.

5. The ball assembly of claim 1 wherein the depression is defined by a first surface tapering radially outwardly with respect to the central axis and a second surface adjacent to first surface, the second surface extending substantially axially along the outer ball.

6. The ball assembly of claim 5 wherein the depression is also defined by at least one a third surface adjacent the second surface, the at least one third surface extending substantially radially to form a shoulder engageable by the flange portion upon application of an axial load to the retainer.

7. The ball assembly of claim 6 wherein the flange portion of the retainer includes a surface extending substantially radially.

8. The ball assembly of claim 6 wherein the at least one third surface comprises a plurality of bulges projecting from the substantially axially-extending surface the bulges being spaced-apart about the interior of the outer ball.

9. The ball assembly of claim 8 wherein the flange portion of the retainer includes a surface extending substantially radially.

10. The ball assembly of claim 6 wherein the flange portion is spaced apart from the at least one third surface of the outer ball prior to application of an axial load to the retainer.

11. The ball assembly of claim 10 wherein the flange portion moves into engagement with the at least one third surface of the outer ball upon application of an axial load to the retainer.

12. The ball assembly of claim 1 wherein the depression is defined by a first surface tapering radially outwardly with respect to the central axis and a second surface adjacent the first surface, the second surface tapering radially inwardly with respect to the central axis to form a shoulder engageable by the flange portion upon application of an axial load to the retainer by the needle roller.

13. The ball assembly of claim 12 wherein the flange portion of the retainer includes a surface extending substantially radially.

14. The ball assembly of claim 1 further comprising an inner ball positioned in the interior of the outer ball, and at least one resilient tab extending from the base portion of the retainer, the at least one resilient tab being axially opposed to a portion of the inner ball, the at least one resilient tab being resiliently deflectable in response to application of an axial load thereto by the inner ball to permit at least a portion of the inner ball to move out of the interior of the outer ball.

15. The ball assembly of claim 14 comprising a plurality of resilient tabs spaced apart along the base portion of the retainer.

16. The ball assembly of claim 1 wherein an angle $\theta$ is formed between the base portion and a plane extending substantially perpendicular to the central axis, the angle having a value in the range $0° \leq \theta < 90°$.

17. A method of making a ball assembly for a tripot style joint, comprising the steps of:

providing an annular outer ball having a central axis and an interior portion including a plurality of adjacent surfaces formed therein to define a depression;

positioning a needle roller along the interior portion of the outer ball;

providing an needle roller retainer having an annular flange portion and a best portion extending radially inwardly from the flange portion, the base portion being dimensioned so as to reside in an axially opposed relationship to the needle roller when the flange portion is positioned within the depression; and securing the flange portion within the depression such that the flange portion of the retainer is resiliently pivotable within the depression in response to application of an axial load to the base portion of the retainer.

18. The method of claim 17 wherein the step of securing the flange portion within the depression comprises the step of forming an interference fit between the flange portion and the depression.

\* \* \* \* \*

UNITED STATES PATENT AND TRADEMARK OFFICE
CERTIFICATE OF CORRECTION

| | | |
|---|---|---|
| PATENT NO. | : 7,396,283 B2 | Page 1 of 1 |
| APPLICATION NO. | : 11/258495 | |
| DATED | : July 8, 2008 | |
| INVENTOR(S) | : Perrow et al. | |

It is certified that error appears in the above-identified patent and that said Letters Patent is hereby corrected as shown below:

Column 6; Claim 3; Line 63; delete "ban" and insert --has--

Column 7; Claim 5; Line 6; delete "to" and insert --the--

Column 8; Claim 17; Line 24; delete "best" and insert --base--

Signed and Sealed this

Fourth Day of November, 2008

JON W. DUDAS
*Director of the United States Patent and Trademark Office*